(12) United States Patent
Kim

(10) Patent No.: US 6,680,911 B1
(45) Date of Patent: Jan. 20, 2004

(54) DEVICE FOR CONTROLLING DATA FLOW IN ETHERNET AND METHOD THEREOF

(76) Inventor: In Kim, Jukong APT. 11 danji, #1107-806, Sanggye 8-dong, Nowon-gu, Seoul (KR)

( * ) Notice: Subject to any disclaimer, the term of this patent is extended or adjusted under 35 U.S.C. 154(b) by 0 days.

(21) Appl. No.: 09/473,845

(22) Filed: Dec. 28, 1999

(30) Foreign Application Priority Data

Dec. 28, 1998 (KR) .......................................... 98-59206

(51) Int. Cl.[7] ................................................. H04J 3/14
(52) U.S. Cl. ..................................... 370/235; 370/445
(58) Field of Search ................................ 370/230, 235, 370/389, 401, 407, 408, 445, 446, 447

(56) References Cited

U.S. PATENT DOCUMENTS

| | | | | |
|---|---|---|---|---|
| 5,450,594 A | * | 9/1995 | Aden et al. ................... | 370/445 |
| 5,608,726 A | * | 3/1997 | Virgile ......................... | 370/401 |
| 5,796,738 A | * | 8/1998 | Scott et al. ................... | 370/401 |
| 5,854,790 A | * | 12/1998 | Scott et al. ................... | 370/401 |
| 5,884,040 A | * | 3/1999 | Chung .......................... | 370/401 |
| 6,061,357 A | * | 5/2000 | Olshansky et al. ......... | 370/401 |

* cited by examiner

*Primary Examiner*—Chau Nguyen
*Assistant Examiner*—Keith M. George
(74) *Attorney, Agent, or Firm*—Cha & Reiter

(57) ABSTRACT

An apparatus and method for controlling the data flow of the Ethernet hub in a half-duplex mode, wherein the hub includes a switch to control data packets flowing through a plurality of communication ports. The system includes a destination address (DA) detector for detecting the DA of the data packet received through the input-port of the communication port to determine whether the data packet is to be treated by the switch, a logic gate for generating a selection signal based on the determination of the DA detector and an overload signal supplied by the switch when the hub is overloaded with the data packets, a jamming signal generator for generating a jamming signal in response to the selection signal, a MAC for converting the data packet into a bit stream as set forth in a carrier-sense multiple access with a collision detection (CSMA/CD) protocol, and a selector for selectively transmitting the jamming signal or the packet from the MAC in response to the selection signal.

8 Claims, 3 Drawing Sheets

DEVICE FOR CONTROLLING DATA FLOW IN ETHERNET AND METHOD THEREOF

This application makes reference to, incorporates the same herein, and claims all benefits accruing under 35 U.S.C. Section 119 from an application for DEVICE FOR CONTROLLING DATA FLOW IN ETHERNET AND METHOD THEREFOR filed in the Korean Industrial Property Office on Dec. 28, 1998 and duly assigned Serial No. 98-59206.

BACKGROUND OF THE INVENTION

1. Field of the Invention

The present invention relates to an apparatus and method used for controlling the data flow of Ethernet hub in half-duplex mode.

2. Description of the Related Art

Ethernet LAN (Local Area Network) is a multiaccess, packet-switched network which uses a passive broadcast medium that provides the means to exchange data packets between the switches of Ethernet or between a data terminal equipment (DTE) and an Ethernet switch. The DTE is a data application device for transmitting and receiving the data packets by employing a communication protocol.

Ethernet as set forth in IEEE 802.3 is a standard protocol for a LAN with hubs at the center of the star configuration, with the wires radiating outward to connect the various network devices, which could include a plurality of DTEs connected thereto by unshielded, twisted paired (UTP) cables. As its name implies, the UTP cable resembles a telephone cable which consists of eight wires for connecting the plurality of DTEs to the hub. The UTP cable is also known as "10 base T" or "100 base T" depending on the network speed offered to each port by Ethernet hubs of 10 Mbps or 100 Mbps. The hub basically consists of a multi-port repeater for communicating with DTEs. However, the multi-port repeater indiscriminately allows the transfer of data packet destined to the intended DTE as well as the unintended DTE. Thus, it is difficult to maintain communication security and effectively use the available bandwidth.

In order to resolve above problem, a hub having a multi-port switch was developed to replace the multi-port repeater, as shown in FIG. 1. In FIG. 1, the hub 110 with the multi-port switching includes a plurality of ports connecting various DTEs (120_1 to 120_n). The hub 110 detects for the destination address (DA) of a packet received through each input port to identify the destination port. After decoding the address, the switch sends the packet directly to its destination or sometimes stores the packet in its internal memory for an eventual transmission to the destination. However, in the store-and-forward architecture, if the number of the data packets stored in the internal memory increases beyond the memory capacity prior to transmission, the data can be lost. Accordingly, the data flow control of the hub 110 is needed to prevent such traffic overload. There are two types of data flow controls, one of which is a pause frame transmission method used in the full-duplex mode of MAC and the other is a back pressure method used in the half-duplex mode of medium access control (MAC).

The pause frame transmission method is specified in the IEEE802.3x standard. If there is a traffic overload in the store-and-forward scheme, a control packet defined as a pause packet is sent to the DTEs to prevent any further transmission of the packet. This type of pause frame transmission method in the full-duplex mode is used for the paired connection between the switch and the DTE, between DTEs or between switches.

The above technique is not in the repeater, which uses the half-duplex mode. In the half-duplex mode, a jamming signal is sent to the transmission port to stop the transmission of the packets when the receiving port encounters the traffic overload. As illustrated in FIG. 2, if the packet memory (not shown) of the hub 110 reaches the traffic threshold and continuously receives the packets through the multiple input ports (not shown), the switch 210 of the hub regards this situation as a collision between the transmitted packet and the received packet. Upon such determination, a jamming signal generator 212 generates a jamming signal to prevent the transmission of data packets to a selector 216 via an overload signal line 220. The function of the selector 216 is to deliver the transmitted packets from the MACs 214 to the designated DTE. After receiving the jamming signal, the role of the selectors 216 is switched to delivering the jamming signal through the respective output-port 218 and the DTE to prevent the transmission of packets.

While the above method may control the packet generating sources by supplying the jamming signal to prevent the traffic overload, it also obstructs the transmission of local traffic relating to other terminals connected to the same repeater segment, thereby even preventing the packet transmission of some terminals not associated with the switch in the traffic overload problem. Thus, the jamming signals are delivered even to some terminals, which carry the local repeater traffic and which is not linked/processed by the overload switch.

SUMMARY OF THE INVENTION

It is an object of the present invention to provide an apparatus and method for controlling data flow of the Ethernet hub in a half-duplex mode in order to secure the local repeater traffic without being affected by the unrelated transmission interruption signal from the hub switching.

It is another object of the present invention to control the jamming signal to ensure the local repeater traffic from being affected by the jamming signal originated from the unrelated switch and still perform the data flow control of the Ethernet hub in a half-duplex mode.

According to the embodiment of the present invention, an apparatus is provided for controlling the data flow of the Ethernet hub in a half-duplex mode which includes a switch to control the data packets flow through a plurality of communication ports, the apparatus comprising a destination address (DA) detector for detecting the DA of a data packet received through the input-port of the communication port to determine whether the packet is to be treated by the switching hub; a logic gate for generating a selection signal based on the determination of the DA detector and an overload signal supplied by the switch indicating traffic overload; a jamming signal generator for generating a jamming signal for preventing the transmission of data packets in response to the selection signal, an MAC for converting the packet into a bit stream to be transferred according to the Ethernet protocol as set forth in a carrier-sense multiple access with collision detection (CSMA/CD); and, a selector for selectively delivering either the jamming signal or the packet from the MAC in response to the selection signal.

According to the embodiment of the present invention, a method is provided for controlling data flow of a Ethernet hub in a half-duplex mode having a switch to control the data packets flow through a plurality of communication ports. The method includes the following steps: detecting a destination address of an incoming data packet received through an input-port of the communication port to determine whether the incoming data packet is to be processed by said switch; generating an overload signal when the switch is overloaded; generating a selection signal in response to a determination that the incoming data packet is to be processed by the switch and that the overload occurs in the switch; generating a jamming signal to prevent the transmission of the data packets in response to the generated selection signal; and, selectively transmitting one of the generated jamming signal and the data packets to an output-port of the communication ports in response to the selection signal.

The foregoing and other objects, features, and advantages of the invention will be apparent from the following, more particular description of preferred embodiments as illustrated in the accompanying drawings. The drawings are not necessarily to scale, the emphasis instead being placed upon illustrating the principles of the invention.

A BRIEF DESCRIPTION OF THE ATTACHED DRAWINGS

A DETAILED DESCRIPTION OF THE PREFERRED EMBODIMENT

In the following description, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
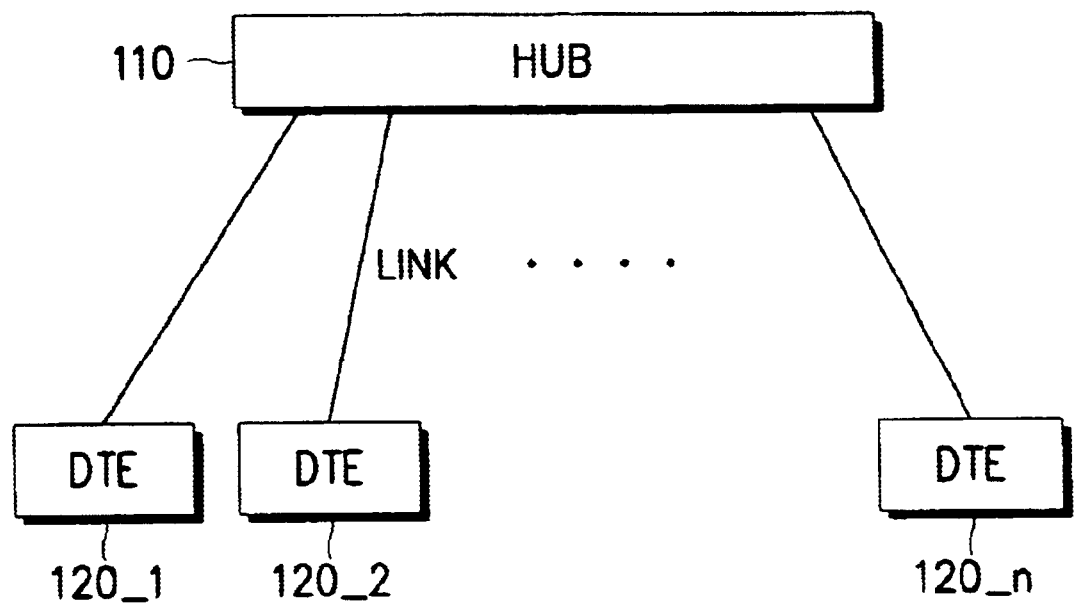
FIG. 1 is a block diagram for illustrating the conventional structure of Ethernet with a multi-port switch.
Figure 2:
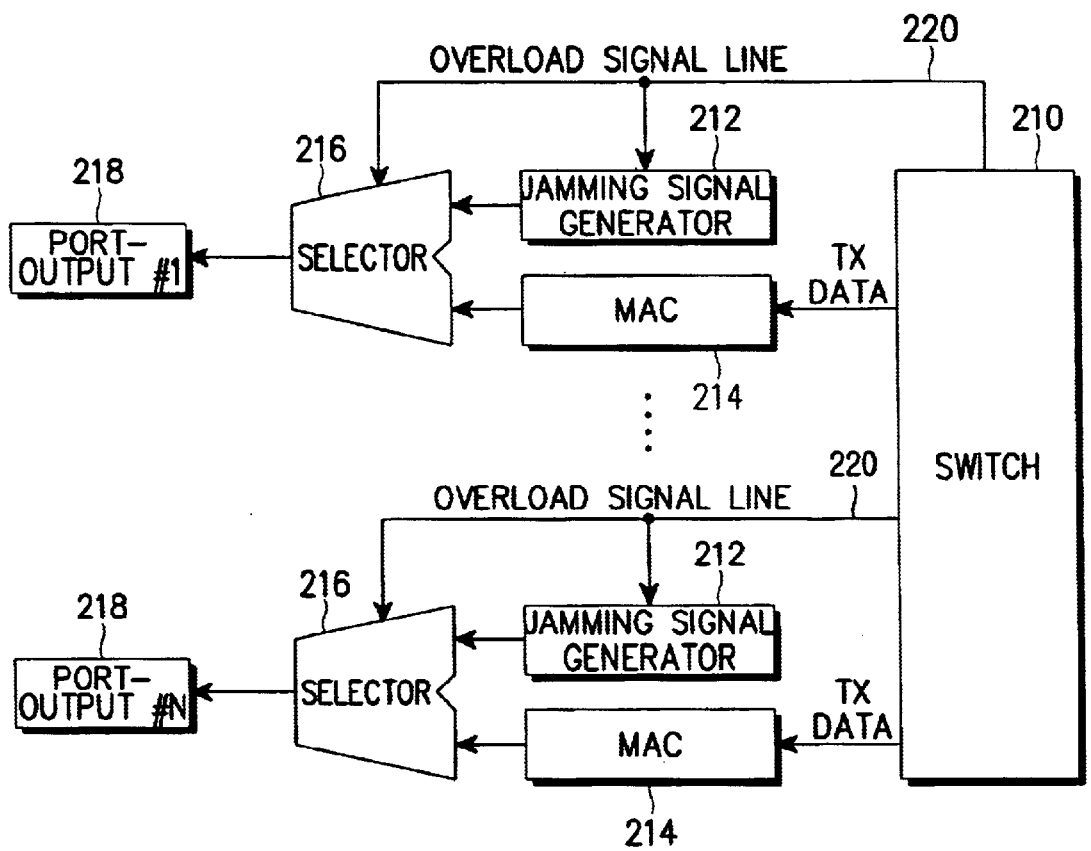
FIG. 2 is a block diagram for illustrating the conventional data flow control of the hub provided in Ethernet in a half-duplex mode; and, FIG. 3 is a block diagram for illustrating the present invention for controlling the data flow of the hub in a half-duplex mode.
Figure 3:
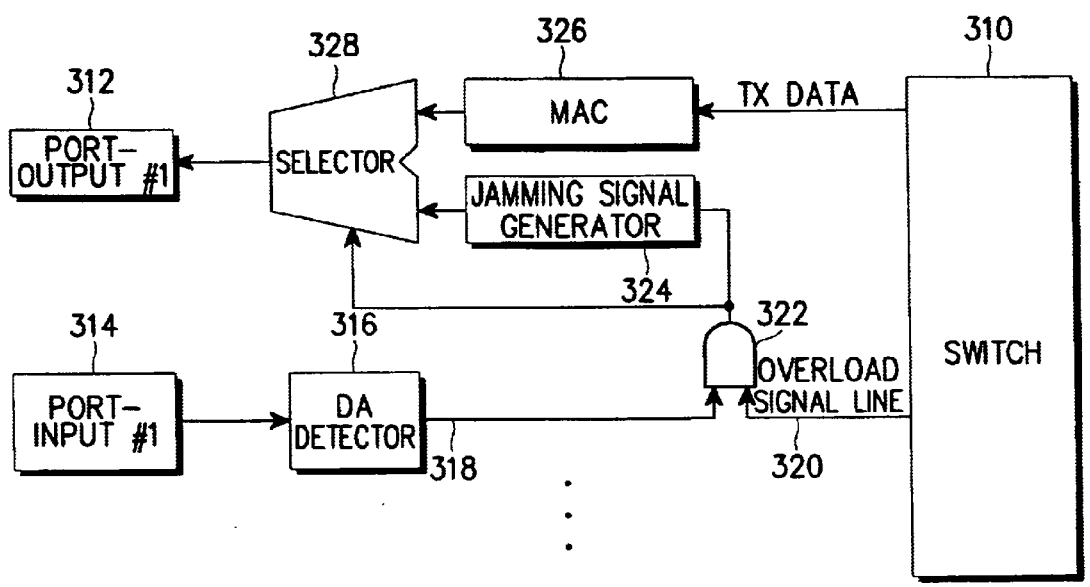

Referring to FIG. 3, an output-port 312 serves as an output connection of a switch 310 for connecting another switch, node, or repeater. The output-port 312 is usually provided with the third and sixth pins of the RJ45 connector, a Tx transformer, and a Tx PMD driver in Ethernet. Similarly, an input-port 314 acts as an input connection of the switch 310 for connecting another switch, node, or repeater. The input-port 314 is usually provided with the first and second pins of the RJ45 connector, a Rx transformer, and a Rx PMD driver. The RJ45 connector is used to connect with a twisted paired (UTP) cable.

A destination address (DA) detector 316 is provided to detect the DA of a received data packet to determine whether the received packet is destined to the local repeater traffic or to be treated by the switch 310. Upon such determination, the detector sends a determination signal through a local traffic line 318. For example, when the packet is to be treated directly by the switch 310, it generates a logically high signal with the value of "1"; otherwise, a logically low signal with the value of "0" is generated.

A switch overload signal line 320 is provided to deliver an overload signal indicating that the switch 310 is overloaded with packets. For example, when the switch is overloaded with packets, a logically high signal with the value of "1" is delivered as the overload signal via the overload signal line; otherwise, a logically low signal with the value of "0" is generated as the overload signal.

A logic gate 322 is provided to generate a selection signal in response to the DA determination signal from the local traffic line 318 and the overload signal from the overload signal line 320. For example, the logic gate 322 generates the selection signal requesting the generation of a jamming signal only upon receiving the determination signal of a logically high "1" through the local traffic line 318 and the overload signal of a logically high "1" through the overload signal line 320. The selection signal may be a logically high "1" or a logically low "0" depending on the determination of the DA and the overload signals.

A jamming signal generator 324 generates the jamming signal in response to the selection signal from the logic gate 322. Namely, when the selection signal represents that the switch 310 is overloaded with the packets and the packet presently inputted to the DA/detector 316 is to be treated by the switch 310, it generates the jamming signal represented by a frame consisting of 32 bits with a value of "1."

The MAC 326 is provided to convert the transmitted packet into a bit stream to be transferred according to the Ethernet protocol of CSMA/CD when the switch 310 works normally without the overload. The selector 328 selectively delivers the output of MAC 326 or the output of the jamming signal generator 324 to the output-port 312 in response to the selection signal provided by the logic gate 322. When the switch is overloaded and the received packet inputted to the DA detector 316 is to be treated by the switch 310, the selector 328 connects the jamming signal to be transmitted to the output-port (312), or otherwise connects the output from the MAC 326 to the output-port.

Before describing the operation of the present invention for the control data flow of the hub, it is assumed, as described above, that the DA detector 316 generates a logically high signal "1" upon receiving a packet to be treated directly by the switch 310, or a logically low signal "0" when the received packet belongs to the local traffic, and the switch 310 generates a logically high signal "1" when overloaded, or a logically low signal "0" when not overloaded.

When the switch 310 does not encounter the traffic overload after receiving a new data packet to be treated by the switch, it delivers the newly received data packet to MAC 326 to be transferred through the selector 328, or stores the newly received data packet into the internal packet memory of the switch so that the received packets can be sequentially transferred later. At the same time, the switch 310 generates the overload signal of a low level through the overload signal line 320 indicating that there is no traffic overload. However, when the switch 310 encounters the traffic overload as a result of the newly received packet, the switch generates the overload signal of a high level through the overload signal line 320. Meanwhile, the DA detector 316 detects the DA registered in the DA region of the newly received packet to determine whether the packet is directed to the local repeater traffic or the switch 310. If the packet belongs to the local repeater traffic, the DA detector 316 generates a determination signal of a low level through the local traffic line 318. In contrast, if the packet belongs to the switch 310, the DA detector 316 generates a determination signal of a high level through the local traffic line 318.

Then, the logic gate 322 generates the selection signal based on the jamming signal responsive to the overload signal from the switch 310 and the determination signal from the DA detector 316. Namely, the logic gate 322 generates the selection signal demanding the generation of the jamming signal only when both the DA determination signal and the overload signal are of high level. For defining the selection signal requesting the generation of the jamming signal as logically high, the logic gate 322 should be an AND gate; otherwise, it should be a NAND gate for defining as a logically low level. Thus, if the logic gate 322 is an AND gate, it generates the selection signal of high level when the switch 310 is overloaded with the packets and the DA detector detects the packet which is to be treated by the switch. When these two conditions are present, the jamming signal is produced.

The selection signal from the logic gate 322 is delivered to both the selector 328 and the jamming signal generator 324 so that the jamming signal generator 324 can generate the jamming signal in response to the selection signal of high level. If the selector 328 receives the selection signal of low level, it selects the packet from MAC 326 to be transferred to the port-output 312. If the selector 328 receives the selection signal of high level, it selects the jamming signal from the jamming signal generator 324 to be transferred to the port-output 312. Such signal processing is summarized in Table 1.

TABLE 1

| Overload Signal | Determination Signal | Selection Signal | Output |
| --- | --- | --- | --- |
| 0 | 0 | 0 | Packet Transfer |
| 0 | 1 | 0 | Packet Transfer |
| 1 | 0 | 0 | Packet Transfer |
| 1 | 1 | 1 | Jamming Signal |

In Table 1, an AND gate is used as the logic gate 322. Firstly, the overload signal of a low level ("0") causes the packet to be normally transferred regardless of the state of the determination signal from the DA detector 316. Secondly, when the logic gate receives the overload signal of a high level ("1") and the determination signal of low level, the switch 310 is considered to be overloaded with the packets. But the additional packets coming into the DA detector are normally transferred because they are considered to be directed to the local repeater traffic. However, upon receiving both the overload signal and the determination signal of a high level ("1" and "1"), the logic gate generates the selection signal requesting the generation of the jamming signal to prevent the packet from being transferred because the additional packet cannot be treated by the switch 310 that is overloaded. Of course, another signal format different from Table 1 may be employed and allow the logic gate to generate the selection signal requesting the generation of the jamming signal only when the switch 310 is overloaded and an additional packet inputted to the DA detector is to be treated by the switch.

Although the above description is made for a single output-port of the hub, it can be naturally applied to all the ports thereof. Thus, the present invention provides Ethernet with the means to ensure the normal transfer of the packets belonging to the local repeater traffic even when the switch is overloaded, thus improving the efficiency of the hub. While the present invention has been described in connection with specific embodiments accompanied by the attached drawings, it will be readily apparent to those skilled in the art that various changes and modifications may be made thereto without departing from the gist of the present invention.

What is claimed is:

1. An apparatus for controlling data flow of Ethernet hub in a half-duplex mode, said hub having a switch to control the data packet flow through a plurality of communication ports, said apparatus comprising:

means for detecting a destination address (DA) of said data packet received through an input-port of said communication ports to determine whether said detected packet is to be processed by said switch;

means for generating a selection signal in response to a determination of said detecting means and an overload signal transmitted from said switch indicating a traffic overload in said switch;

means for producing a jamming signal transmitted from a selected output-port to a source of the data packet transmission to prevent further transmission of said data packet to said switch in response to said selection signal;

means, coupled to the output of said switch, for converting said data packets into a bit stream and for interfacing said converted bit stream to be transmitted with an output port of said communication port; and, means for selectively transmitting one of said jamming signals from said signal generating means and said data packets from said converting means in response to said selection signal so that local traffic that does not require processing of the switch is not affected by the jamming signal transmitted by said switch.

2. The apparatus as defined in claim 1, wherein said selection signal generating means comprises an AND gate for generating said selection signal in response to the determination that said data packets are processed by said switch and said overload occurs in said switch.

3. The apparatus as defined in claim 2, wherein said selection signal generating means converts said data packet into said bit stream according to an Ethernet protocol as set forth in a carrier-sense multiple access with collision detection (CSMA/CD).

4. An apparatus for controlling data flow of Ethernet hub in a half-duplex mode, said hub having a switch to control the data packet flow through a plurality of communication ports, said apparatus comprising:

a detector for detecting a destination address (DA) of said data packet received through an input-port of said communication ports to determine whether said detected packet is to be processed by said switch;

a logic gate for generating a selection signal in response to a determination of said detector and an overload signal transmitted from said switch indicating a traffic overload in said switch;

a signal generator for producing a jamming signal that is transmitted from a selected output-port to a source of the data packet transmission to further prevent the transmission of said data packet to said switch in response to said selection signal from said logic gate;

a medium access control (MAC) coupled to the output of said switch for converting said data packets into a bit stream and for interfacing said converted bit stream to be transmitted with an output port of said communication port; and, a selector for selectively transmitting one of said jamming signals from said signal generator and said data packets from said MAC in response to said selection signal, so that local traffic that does not require processing of the switch is not affected by the jamming signal transmitted by said switch.

5. The apparatus as defined in claim 4, wherein said logic gate comprises an AND gate for generating said selection signal in response to the determination that said data packets are processed by said switch and said overload occurs in said switch.

6. The apparatus as defined in claim 5, wherein said MAC converts said data packet into said bit stream according to an Ethernet protocol as set forth in a carrier-sense multiple access with collision detection (CSMA/CD).

7. A method of controlling data flow of Ethernet hub in a half-duplex mode, said hub having a switch to control data packets flow through a plurality of communication ports, said method comprising the steps of:

detecting a destination address of an incoming data packet received through an input-port of said communication port to determine whether said incoming data packet is to be processed by said switch;

generating an overload signal when said switch is overloaded;

generating a selection signal in response to a determination that said incoming data packet is to be processed by said switch and that said overload occurs in said switch;

generating a jamming signal that is transmitted from a selected output-port to a source of the data packet transmission to prevent further transmission of said data packets in response to said generated selection signal; and, selectively transmitting one of said generated jamming signals and said data packets to an output-port of said communication ports in response to said selection signal, so that local traffic that does not require processing of the switch is not affected by the jamming signal transmitted by said switch.

8. The method as defined in claim 7, wherein said selection signal produces said jamming signal in response to the determination that said incoming data packet is to be processed by said switch and said overload occurs in said switch.

* * * * *